United States Patent Office 2,748,715
Patented June 5, 1956

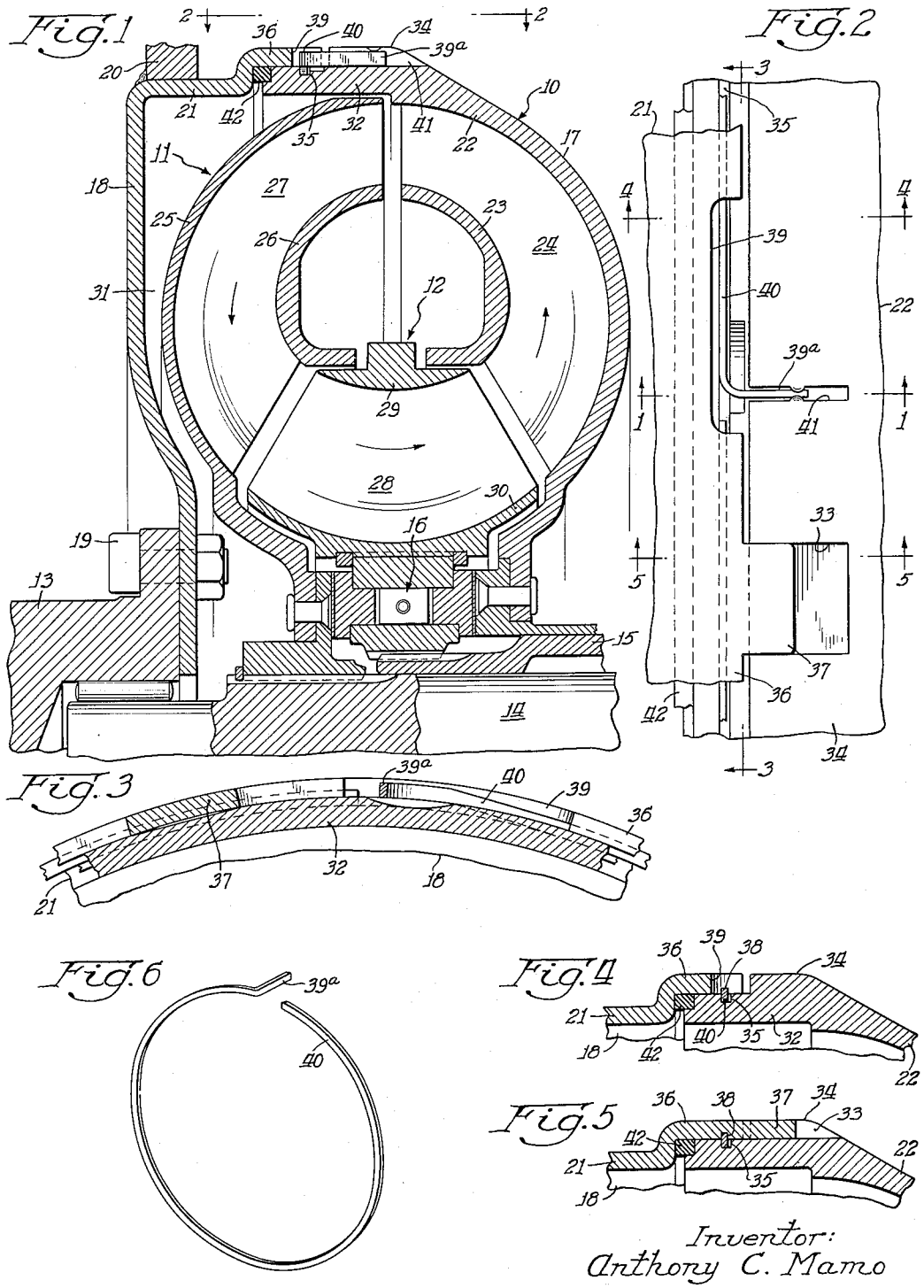

2,748,715

HYDRODYNAMIC COUPLING

Anthony C. Mamo, Detroit, Mich., assignor to Borg-Warner Corporation, Chicago, Ill., a corporation of Illinois Application December 20, 1952, Serial No. 327,101

5 Claims. (Cl. 103—115)

This invention relates to hydrodynamic couplings and more particularly to such couplings comprising a vaned pump and a vaned turbine, the pump usually including a driving member of disk or dished-like shape and a vaned annular shell connected together to define a fluid chamber receiving the turbine, the driving member being connected to a source of power, such as an engine, for driving the pump.

In the manufacture of hydrodynamic couplings, the vanes and shell of the pump and turbine are conventionally formed of aluminum, or other light weight metal, by casting processes such as die-casting, sand-casting, or plaster mold casting for purposes of economy. The pump shell is usually connected to an annular disk or dished-shaped driving member to provide a fluid chamber, the driving member being formed of cast iron, or a stamping of sheet metal such as steel, having the inherent strength required to transfer torque from an engine to the vane shell of the pump. A problem exists in the securing of the steel driving member to the aluminum shell in an economical and expeditious manner in the manufacture of fluid couplings and, in view of the inability to electrically weld aluminum and steel, it is necessary to provide a mechanical connection between the steel driving member and aluminum shell which is capable of preventing axial separation of the member and shell by the fluid, under high pressure, in the fluid chamber defined by the shell and member, and consequent escape or leakage of fluid from the chamber, as well as being able to effectively withstand the considerable forces, engendered by the transmission of torque from the driving member to the shell, tending to sever the connection of the member and shell, during operation of the coupling. It has been proposed to form radially extending flanges on the outer peripheries of the driving member and shell and provide openings in the flanges for receiving bolts to secure the shell and member together. Also, it has been suggested that the flanges of the shell and member could be formed with threads to threadedly engage the same or to be engaged with a threaded ring, to secure the driving member and shell to each other. Such mechanical connections of the shell and driving member are expensive and costly in the manufacture and production quantities due to the labor cost involved in bolting the shell and driving member together requiring the bolts to be uniformly tight in order to insure that the gasket usually positioned between the member and shell will be effective to prevent leakage of fluid, under high pressure from the fluid chamber provided by the assembly; or the alternative connection requires the employment of expensive machines to provide threads on the flanges of the driving member and shell to effect engagement with each other or with the threaded ring with the possibility that the threads, particularly on the aluminum shell, can be readily stripped, in the assembly of the shell and driving member.

It is an object of the invention to provide an improved arrangement for connecting a driving member and a vaned shell of the hydrodynamic coupling element, such as a pump.

It is another object of the invention to provide a hydrodynamic coupling vaned element comprising a driving member of disk or dished-shaped form and a vaned shell having their outer peripheries formed to provide axially extending overlapping edges with the ends of the driving member and shell being formed with interlocking lugs and grooved portions to provide a driving connection between the driving member and shell and with the ends of the driving member and shell also being provided with circumferentially extending and radially aligned grooves receiving a locking member to prevent axial separation of the driving member and shell by the fluid, under high pressure, in the fluid chamber defined by the driving member and shell, during operation of the fluid coupling.

Other objects and advantages of the invention will become apparent from the following description taken in connection with the drawing in which:

Fig. 1 is a cross-sectional view through the upper half of a fluid coupling illustrating a vaned pump embodying my invention;

Fig. 2 is an enlarged edge elevational view of a portion of the vaned pump shown in Fig. 1 and showing details of the mechanical connection including a locking element, between the driving member and shell of the pump;

Figs. 3, 4 and 5 are sectional views taken on lines 3—3, 4—4, and 5—5 of Fig. 2;

Fig. 6 is a prespective view of the locking element shown in Fig. 2.

Referring to Fig. 1, the hydrodynamic coupling there shown is of the torque converter type and comprises three vaned elements, namely a pump 10, a turbine 11, and a stator 12. The pump 10 is secured to a drive shaft 13 coupled to a source of power, such as an engine, and the turbine 11 is connected to a driven shaft 14 for operating any desired mechanism. The stator 12 has an overrunning connection to a stationary reaction sleeve 15 through the medium of a one-way sprag type clutch 16, such as shown and described in U. S. Patent 2,366,842 issued January 9, 1945.

The pump 10 may be formed of two annular and generally dished-shaped members 17 and 18 in axial alignment. The member 18 is in the form of a disk having an axially extending outer peripheral portion 21 secured to the driving shaft 13 by bolts 19 and may be provided with an annular toothed band 20 surrounding and secured to the radially outer peripheral portion 21 to provide a fly wheel for cooperation with the gears of an electric starter motor in the event that the device is used with an internal combustion engine. The member 17 may comprise a shell 22 of semi-toroidal shape and a core ring 23 of generally similar shape, and vanes 24 extending between and connected to the shell and core ring. The turbine 11 also comprises a semi-toroidal shell 25 and core ring 26 having vanes 27 extending between and secured to the shell and core ring. The stator 12 comprises vanes 28 extending between the core ring 29 and shell 30. It will be understood that the shell and core ring of each vaned element described are both annular and complete rings, although only portions of the shells and core rings are illustrated in the drawing and the vanes may be curved and of varying thickness, such as those shown in U. S. Patents 2,306,758 and 2,333,680. The three vaned elements form and function as a hydrodynamic torque converter with the vanes of the pump functioning to impart energy to a body of fluid or liquid in the chamber 31 formed by the driving member 17 and shell 22 of the pump, the turbine receiving energy from the liquid and the stator being held from rotation and functioning as a reaction element by the one-way clutch to change the direction of the flow of the liquid so that the device functions to multiply torque until such time that the change in the direction of fluid leaving the turbine and entering the stator of the fluid circuit, indicated by the arrows, causes the stator to be released by the one-way clutch 16 to provide a substantially direct drive connection between the drive shaft 13 and the shaft 14.

The shells, vanes, and core ring of each vaned element described are of aluminum and may be formed as an integral unit by die-casting, sand-casting, or plaster mold casting, methods conventionally employed to provide for the facile and economical manufacture of these vaned elements. The disk 18 of the pump is preferably formed of sheet metal for obtaining the advantages of lightness in weight and the required strength for the transmission of torque, the disk being made to assume the shape shown in Fig. 1 by a simple stamping operation.

It has been customary in the art to connect a steel driving member, such as 18, to an aluminum shell, such as 22 by mechanical connections, in view of the inability to weld steel to aluminum. Such mechanical connections have heretofore necessitated the provision of holes in radially extending flanges on the outer peripheries of the driving disk and the shell for receiving bolts to connect the disk and shell together; or, by forming threads on the outer peripheral edges of the driving disk and shell and threadedly engaging these members, or employing a threaded ring engaging threads on the disk and shell to securely hold the disk and shell together for torque transmission. Both of these ways of mechanically connecting the driving disk and a shell are inefficient and expensive operations in mass production manufacture, in view of the labor costs involved and the necessity of employing expensive automatic drilling or thread-forming machines. Also, one-way clutches for the stator become worn in use and require replacing, which necessitates the disassembly of the torque converter, including the driven disk and the shell, and the reassembly of these parts of the hydraulic torque converter, which feature is disadvantageous because of the considerable time required for making these operations in making repairs and consequent disabling of the mechanism, such as an automobile, with which the converter is used.

The present invention is directed to the provision of a simple and inexpensive mechanical connection for the driving member and vaned shell of a hydrodynamic coupling vaned element, such as a pump, and defining a closed fluid chamber containing the working parts of the hydrodynamic coupling. The proposed mechanical connection considerably expedites the time required to assemble and disassemble a hydrodynamic coupling with attendant low cost of labor and without the necessity of employing expensive machines increasing the cost of manufacture of a hydrodynamic coupling vaned element, such as a pump.

As previously described, the pump 10 comprises the shell 22, vanes 24 and core ring 23 which are formed by any suitable method to provide an integral unit, being preferably cast by die-casting, sand-casting or by the use of plaster molds. Assuming that the pump shell, vanes and core ring are cast by the use of a plaster mold, the mold is formed with the required and desired shapes to form these parts of the pump as shown in Fig. 1, including the provision of an axially extending flange 32 at its radially outer periphery of the pump shell 22 as shown in Fig. 1, the flange 32 being provided with circumferentially spaced grooves 33 on a circumferentially extending and radially outwardly projecting rib 34 on the flange 32 and in spaced relation to the end of the flange 32 (as shown in Fig. 1) which flange end is provided with a circumferentially extending groove 35 as shown in Figs. 1, 4 and 5. In forming the shell, vanes, and core ring of the pump, molten aluminum is poured into the mold and allowed to cool to solidify the same and thereby produce a cast aluminum structure shown in Fig. 1. Referring to the disk 18, the disk 18 is preferably formed by a simple stamping operation which is effective to provide the flange 21 with a radially offset end portion 36 extending circumferentially and having axially extending lugs 37 and a radially inner groove 38, the end portion 36 being provided with a notch 39. The end portion 36 of the disk 18 is shown as being in overlapping and telescoping relation to the flange 32 of the shell 22 with the lugs 37 of the disk end 36 being received within the notches 33 in the raised portion or rib 34 of the shell 22, the groove 35 in the shell 22 and the groove 38 in the disk 18 being opposed to each other for receiving a locking element in the form of a wire 40 which may be fed through a slot 41 in the raised rib 34 of the shell 22 and into the opposed annular grooves 35 and 38 to prevent axial separation of the driving member 18 and shell 22 of the pump, the wire being shown in Fig. 6 and having an end portion 39a positioned in the slot 41 of the shell 22 to permit the ready disassembly of the driving member 18 and shell 22 of the pump.

It will be apparent that the interlocking arrangement of the driving member 18 and shell 22 of the pump provided by the lugs 37 of the driving member received within the notches 33 in the shell provides a driving arrangement between the driving member 18 and shell 22 of the pump for the transmission of torque and that the locking element 40 positioned within the opposed grooves 35 and 38 in the shell and driving member, respectively, will function to effectively resist any axial separation of the driving member and shell by fluid, under high pressure in the chamber 31 during the operation of the hydrodynamic coupling.

In the assembly of the driving member and the shell of the pump, the driving member and shell are positioned with respect to each other so that the flange 21 of the driving member and the flange 32 of the shell are axially aligned with each other and moved toward each other to telescope the flange 36 of the driving member with the flange 32 of the shell to position the lugs 37 on the driving member within the notches 33 of the shell, a gasket 42 of rubber, or other suitable sealing material, being positioned between the flange 21 and flange 32 for compression there-between during this assembly operation. With the driving member and shell assembled as described, the opposed grooves 35 and 38 in the shell and driving member will be in opposed relation to each other. The flexible wire 40 may then be fed into the opposed grooves through the notch 39 in the end portion 36 of the driving member until the wire 40 surrounds the shell 22 at which time the end 39a may be bent at a right angle to the grooves to position the end 39a within the slot 41 in the shell 22.

It will be noted that the described mechanical connection permits the ready and easy assembly and disassembly of the driving member and shell of the pump, the disassembly of the shell and pump being quickly accomplished by merely removing the end 39a of the locking element from the groove 41 in the shell, pulling the element to remove it from the grooves 35 and 38 in the shell and driving member, and then separating the shell and driving member by relatively moving the same in an axial direction to withdraw the lugs 37 of the driving member from the grooves 33 in the shell.

It will be apparent from the foregoing description that I have provided a simple and economical mechanical connection for connecting a driving member and a vaned shell of a hydrodynamic coupling vaned element, such as a pump, which can be expeditiously assembled and disassembled and the parts of which can be readily and inexpensively manufactured by simple casting and stamping operations. While I have described and shown a preferred embodiment of my improved mechanical connection arrangement for a hydrodynamic coupling vaned element, it is intended to cover such modifications thereof that come within the scope of the appended claims.

I claim:

1. In a hydrodynamic coupling element, a dished member having its outer periphery defined by an axially extending annular portion terminating in a radially offset and axially extending first flange provided with circumferentially spaced lugs, an annular groove in the radially inner surface of said first flange, and a notch in the edge of said first flange between said lugs and interrupting said groove; a vaned annular shell having an outer peripheral axially extending second flange in telescoping relation to said first flange, said second flange being provided with a rib extending radially outwardly therefrom, said rib having circumferentially spaced openings therein receiving said lugs on said member whereby relative rotation of said shell and member is prevented, means on said second flange defining a groove in opposed relation to the groove in said member when said shell and member are in telescoped relation and means on the radially outer surface of said rib defining an axially extending slot; a sealing gasket compressed between said annular portion of said member and the end of said second flange of said shell; and a split locking ring disposed within the opposed grooves of said shell and member preventing relative translational movement therebetween and having one end thereof extending through said notch in said first flange of said member and received within said slot in the rib of said shell.

2. In a hydrodynamic coupling element, a dished member having its outer periphery defined by an axially extending annular portion terminating in a radially offset and axially extending first flange provided with circumferentially spaced lugs, an annular groove in the radially inner surface of said first flange, and a notch in the edge of said first flange between said lugs and interrupting said groove; a vaned annular shell having an outer peripheral axially extending second flange in telescoping relation to said first flange, said second flange being provided with a rib extending radially outwardly from said second flange, said rib having circumferentially spaced openings therein receiving said lugs on said member whereby relative rotation of said shell and member is prevented, means on said second flange defining a groove in opposed relation to the groove in said member when said shell and member are in telescoped relation, and means on the radially outer surface of said rib defining an axially extending slot; and a split locking ring disposed within the opposed grooves of said shell and member preventing relative translational movement therebetween and having one end thereof received within said slot in the rib of said shell.

3. In a hydrodynamic coupling element, a dished member having its outer periphery defined by an axially extending annular portion terminating in a radially offset and axially extending first flange provided with circumferentially spaced lugs, and means defining an annular groove in the radially inner surface of said first flange; a vaned annular shell having an outer peripheral axially extending second flange in telescoping relation to said first flange, a rib extending radially outwardly from said second flange, means defining circumferentially spaced openings in said rib adapted to receive said lugs on said member whereby relative rotational movement of said member and shell is prevented, and means defining a groove in said second flange in opposed relation to the groove in said member when said shell and member are in telescoped relation; a locking ring disposed within the opposed grooves of said shell and member whereby relative translational movement thereof is prevented, and means on the exterior surface of one of said flanges receiving an end portion of said locking ring whereby ready access to said locking ring is provided.

4. In a hydrodynamic coupling element, a pair of annular dished members having axially extending radially outer peripheral portions in telescoping relation and provided with opposed grooves; interengaging means on said portions and spaced from said grooves, preventing relative rotation of said members; a locking member in said grooves to prevent relative axial movement of said dished members, means on said locking member extending outwardly of said grooves, and means on one of said portions receiving said last-mentioned means whereby ready access to said locking member is provided.

5. In a hydrodynamic coupling element, a pair of annular dished members having axially extending radially outer peripheral portions in telescoping relation and provided with opposed grooves; interengaging means on said portions and spaced from said grooves, preventing relative rotation of said members; and a locking member in said grooves to prevent relative axial movement of said dished members, said locking member comprising a split ring having one end thereof projecting from said grooves and axially of said dished members, and means defining a slot in one of said dished members receiving said one end of said split ring to facilitate removal of said ring from said grooves in the disassembly of said dished members.

References Cited in the file of this patent

UNITED STATES PATENTS

| | | |
|---|---|---|
| 2,140,106 | Cox et al. | Dec. 13, 1938 |
| 2,417,195 | Hargreaves | Mar. 11, 1947 |
| 2,493,602 | Sterrett | Jan. 3, 1950 |